United States Patent
Thomas et al.

(10) Patent No.: US 10,108,436 B2
(45) Date of Patent: Oct. 23, 2018

(54) TECHNIQUES FOR BRIDGING BIOS COMMANDS BETWEEN CLIENT AND HOST VIA BMC

(71) Applicant: American Megatrends, Inc., Norcross, GA (US)

(72) Inventors: Satheesh Thomas, Dunwoody, GA (US); Anurag Bhatia, Liburn, GA (US); Sanjoy Maity, Snellville, GA (US); Purandhar Nallagatla, Johns Creek, GA (US); Baskar Parthiban, Johns Creek, GA (US); Ramakoti Reddy Bhimanadhuni, Suwanee, GA (US); Harikrishna Doppalapudi, Norcross, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 100 days.

(21) Appl. No.: 15/247,529

(22) Filed: Aug. 25, 2016

(65) Prior Publication Data

US 2018/0060084 A1    Mar. 1, 2018

(51) Int. Cl.
*G06F 9/44* (2018.01)
*G06F 9/4401* (2018.01)
*G06F 9/48* (2006.01)

(52) U.S. Cl.
CPC .......... *G06F 9/4416* (2013.01); *G06F 9/4406* (2013.01); *G06F 9/4812* (2013.01)

(58) Field of Classification Search
CPC .............................. G06F 9/4812; G06F 9/4406
See application file for complete search history.

(56) References Cited

U.S. PATENT DOCUMENTS

| | | | |
|---|---|---|---|
| 2009/0055665 A1* | 2/2009 | Maglione | G06F 1/206 713/320 |
| 2010/0306357 A1* | 12/2010 | Chen | H04L 43/00 709/223 |
| 2011/0276829 A1* | 11/2011 | Peng | G06F 11/2294 714/30 |
| 2015/0178096 A1* | 6/2015 | Inbaraj | G06F 9/4416 713/2 |
| 2017/0322613 A1* | 11/2017 | Lin | G06F 1/3209 |

* cited by examiner

*Primary Examiner* — Albert Wang
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be an embedded-system device. The embedded-system device receives a first message including first command or data from a client. The embedded-system device triggers a BIOS of a host of the embedded-system device to communicate with the embedded-system device. The embedded-system device receives a request from the BIOS. The embedded-system device sends the first command or data to the BIOS in response to the request.

15 Claims, 5 Drawing Sheets

TECHNIQUES FOR BRIDGING BIOS COMMANDS BETWEEN CLIENT AND HOST VIA BMC

BACKGROUND

Field

The present disclosure relates generally to embedded-system devices, and more particularly, to techniques of bridging BIOS commands and execution results between a client and a host via a baseboard management controller (BMC).

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. The BMC may be considered as an embedded-system device.

In certain circumstances, a client/user may wish to control BIOS behavior or get information from the BIOS at a host. Accordingly, there is a need to provide a mechanism that bridges communication between the host and the client.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an embedded-system device. The embedded-system device receives a first message including first command or data from a client. The embedded-system device triggers a Basic Input/Output System (BIOS) of a host of the embedded-system device to communicate with the embedded-system device. The embedded-system device receives a request from the BIOS. The embedded-system device sends the first command or data to the BIOS in response to the request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In certain circumstances, a client/user needs to control BIOS behaviors or get information from the BIOS at a host. The present disclosure introduces a command based mechanism where the client sends a BIOS command to a BMC, which in turn sends the command to the BIOS. After the BIOS completes the command execution, the BIOS sends a response to the BMC. Then, the client obtains the response for the BIOS commands. This mechanism may allow changes or expansion of the BIOS commands without modifying the BMC firmware.

Figure 1:
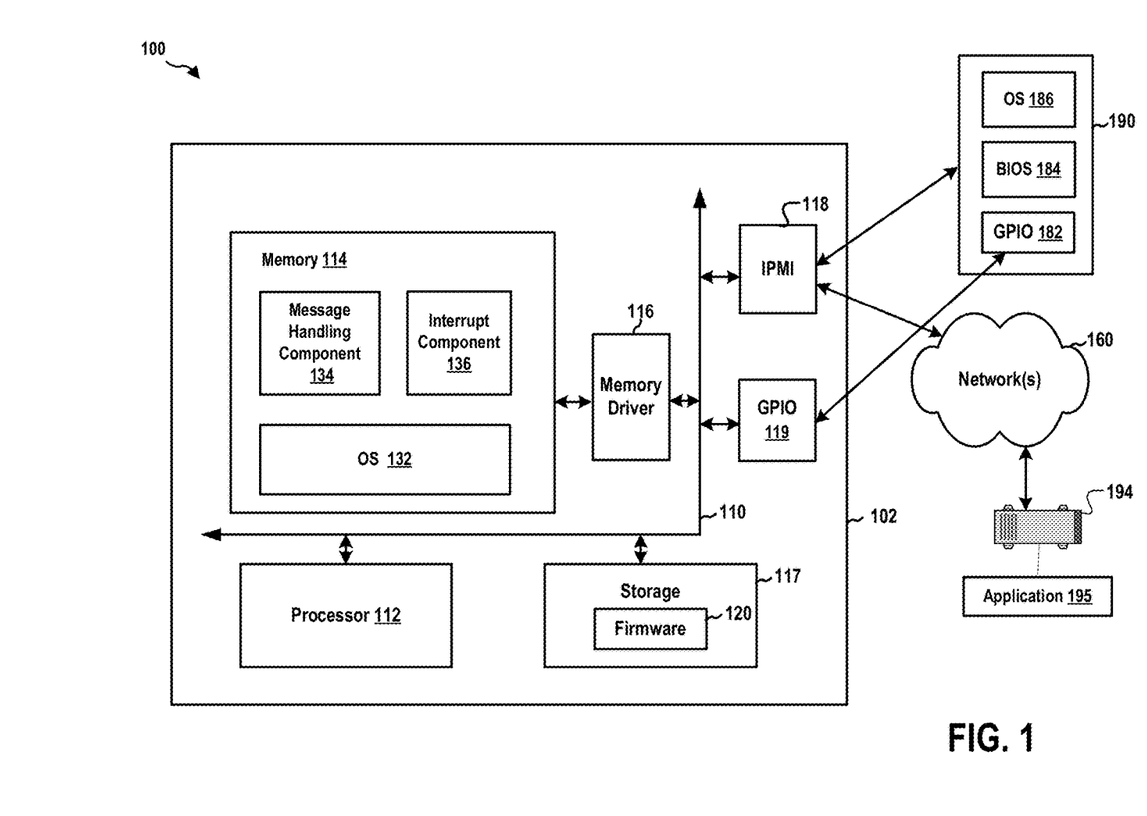
FIG. 1 is a diagram illustrating a computer system.

FIG. 1 is a diagram 100 illustrating a computer system. In this example, the computer system includes, among other things, a BMC 102 and a host computer 190. In certain configurations, the computer system may only include the BMC 102. The BMC 102 has a processor 112, a memory 114, a memory driver 116, a general-purpose input/output (GPIO) component 119, and a storage 117. Further, the BMC 102 may support IPMI and may have an IPMI interface 118. The IPMI interface 118 may be implemented over a keyboard controller style (KCS), a server management interface chip (SMIC), a block transfer (BT) interface, a system management bus system interface (SSIF), a Universal Serial Bus (USB) interface, a network interface, and/or other suitable communication interface(s). The memory 114, the processor 112, the memory driver 116, the storage 117, the GPIO component 119, and the IPMI interface 118 may be in communication with each other through a communication channel 110 such as a bus architecture.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, an operating system (OS) 132, a message handling component 134, and an interrupt component 136.

The BMC 102 may be in communication, through one or more of the communication interface described supra and/or through the IPMI interface 118, with the host computer 190 and/or a network device 194. The BMC may manage the host computer 190. The host computer 190 includes a BIOS 184. When the host computer 190 initially starts, the host computer 190 executes the BIOS 184 in order to boot a host OS 186. The host computer 190 also has a GPIO component 182, which may be connected to an interrupt pin of a processor of the host computer 190. The GPIO component 182 is connected with the GPIO component 119 of the BMC 102 through a communication link. As such, the BMC 102 can send signals through the GPIO component 119 to the GPIO component 182 in order to trigger an interrupt at the host computer 190.

The BIOS 184 may perform a POST procedure. The POST procedure includes a series of individual functions or routines that perform various initialization and tests of the computer hardware such as motherboard hardware, a central processing unit (CPU), a math coprocessor, a timer integrated circuit (IC), a Direct Memory Access (DMA) controller, and/or interrupt request (IRQ) controller, etc. The POST procedure may generate data (e.g., POST codes) during execution.

The communications between the BMC 102 and the network device 194 may be carried over a network 160. The network device 194, among other components, includes a client application 195. As described infra, when the host computer 190 is executing the BIOS 184, the client application 195 may utilize the BMC 102 to send BIOS commands and/or data to the BIOS 184 and to obtain response commands and/or data from the BIOS 184.

Figure 2:
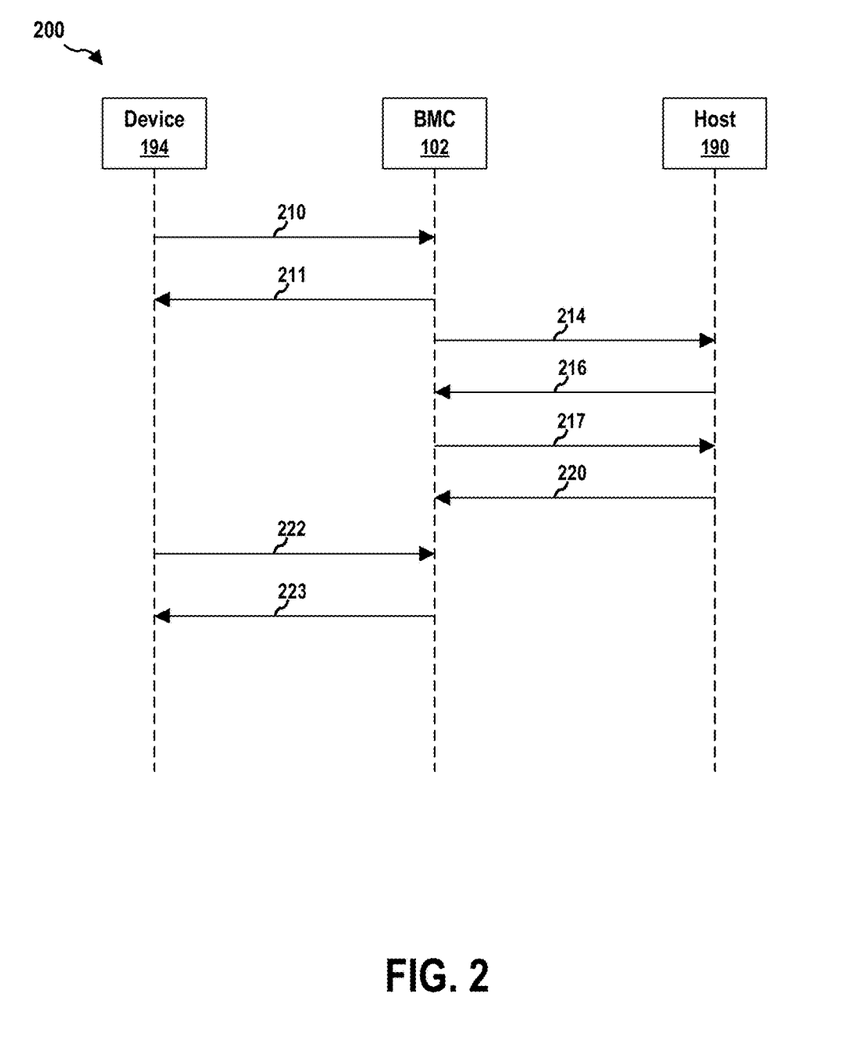
FIG. 2 is a diagram illustrating a communication sequence among a network device, a BMC, and a host computer.

FIG. 2 is a diagram 200 illustrating a communication sequence among the network device 194, the BMC 102, and the host computer 190. Initially, the client application 195 at the network device 194, for example based on user instructions or configurations, prepares particular BIOS commands and/or data that are to be executed by the BIOS 184. For example, the BIOS commands and/or data may include an inquiry command asking about the number processors at the host computer 190. The BIOS commands and/or data may include configuration parameters for updating the BIOS or the host computer 190. The client application 195 then constructs a message 210 and includes the BIOS commands and/or data in the payload of the message 210. The message 210 is in a format recognizable by the message handling component 134 at the BMC 102. In particular, the message 210 may be a customized IPMI message and may be sent to the BMC 102 through the IPMI interface 118. The message handling component 134 is able to process messages (e.g., extracting the payload of the message 210) in accordance with IPMI standards.

In a first configuration, the client application 195 and the message handling component 134 implement a polling mechanism. Accordingly, after receiving the message 210, the message handling component 134 generates an identifier for identifying the message 210. The message handling component 134 then constructs a message 211 and includes the identifier in the payload of the message 211. The message 211 may also be a customized IPMI message. The message handling component 134 sends the message 211 to the client application 195. Upon completing transferring the message 211, the client application 195 and the message handling component 134 may close any communication session established between them. The client application 195 extracts the identifier from the payload of the message 211 and stores the identifier (e.g., in a memory) for use as described infra.

In a second configuration, the client application 195 and the message handling component 134 do not implement a polling mechanism. Accordingly, after sending the message 210, the client application 195 maintains the communication session established with the BMC 102 and waits a response from the BMC 102. The message handling component 134 may not generate an identifier for identifying the message 210. The message handling component 134 may not send the message 211 to the client application 195.

Subsequently, the message handling component 134 at the BMC 102 extracts the BIOS commands and/or data from the payload of the message 210. In particular, the BMC 102 may not interpret the BIOS commands and/or data; the BMC 102 may not even recognize or understand the BIOS commands and/or data. The message handling component 134 may instruct the interrupt component 136 to interrupt the host computer 190. Accordingly, the interrupt component 136 transmits an interrupt signal 214 through the GPIO component 119 to the GPIO component 182 of the host computer 190.

The BIOS 184 at the host computer 190 receives the interrupt signal 214 through the GPIO component 182. In response to the interrupt, the BIOS 184 determines that the BMC 102 is requesting the BIOS 184 to communicate with the BMC 102. The BIOS 184 sends a request message 216 to the BMC 102, asking whether the BMC 102 has commands and/or data to be transmitted to the BIOS 184. In particular, the message 216 may be a customized IPMI message and may be sent to the BMC 102 through the IPMI interface 118. The BIOS 184 then waits an response from the BMC 102.

At the BMC 102, the message handling component 134 receives the message 216. In response to the request, the message handling component 134 constructs a response message 217 and includes in the payload of the message 217 the BIOS commands and/or data extracted from the message 210. The message 217 may be an IPMI response message. The message handling component 134 sends the message 217 to the BIOS 184.

At the host computer 190, the BIOS 184 receives the message 217. The BIOS 184 then extracts the BIOS commands and/or data from the message 217. The BIOS 184 may execute any commands and may process any data extracted from the message 217. For example, the BIOS commands and/or data may include a command that inquires about the number of processors of the host computer 190. The BIOS 184 executes the command and obtains a result. Further, when the BIOS commands and/or data contain updated loading configuration parameters, the BIOS 184 may use those parameters to load the host OS 186. When the processing of the BIOS commands and/or data generates a result, the BIOS 184 may construct a message 220 (e.g., an IPMI message) and may include the result in the payload of the message 220. The BIOS 184 sends the message 220 to the BMC 102.

In the first configuration, the transmissions of the interrupt signal 214, the message 216, the message 217, and the message 220 may be performed in the same transaction. That transaction is associated with the identifier identifying the message 210. Accordingly, the message handling component 134 can determine that the commands and/or data contained in the message 220 is associated with the identifier (and thus the message 210). The message handling component 134 may store, e.g., in the memory of the BMC 102, those commands and/or data as being associated with the identifier. Subsequently, after a predetermined wait period (e.g., 1, 3, or 5 seconds), the client application 195 may send a message 222 including the identifier of the message 210 to the BMC 102, requesting the BMC 102 to send to the client application 195 any command or data received from the BIOS 184 and associated with the identifier of the message 210. Upon receiving the message 222, the message handling component 134 extracts the contained identifier from the message 222. The message handling component 134 may locate, e.g., from the memory, the commands and/or data associated with the identifier. The message handling component 134 may send, to the client application 195, a message 223 including those commands and/or data.

In the second configuration, the transmissions of the message 210, the interrupt signal 214, the message 216, the message 217, and the message 220 may be performed in the same transaction. As such, the message handling component 134 can determine that the commands and/or data contained in the message 220 are generated in response to the message 210. Upon receiving the message 220, the message handling component 134 may send, to the client application 195, the message 223 including the commands and/or data extracted from the message 220. The client application 195 may not send the message 222 to the BMC 102.

Figure 3:
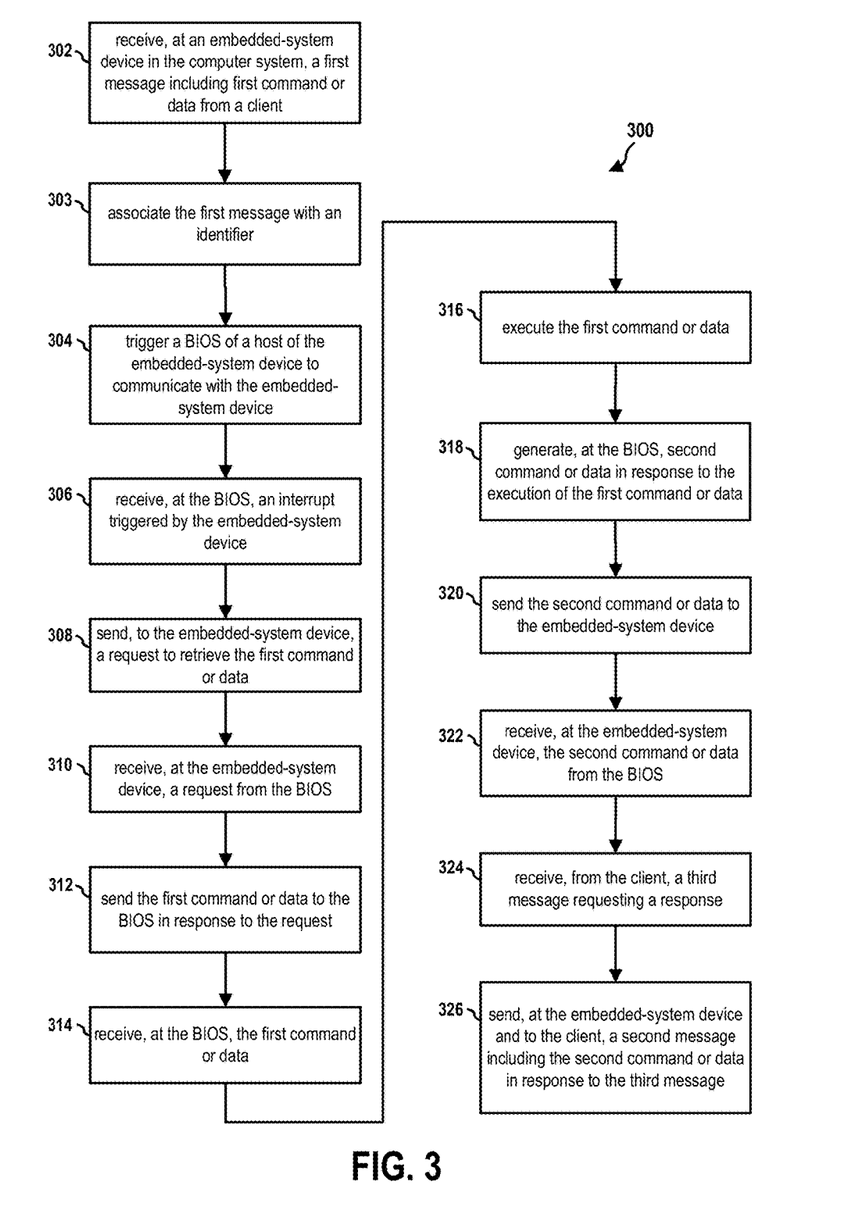
FIG. 3 is a flow chart of a method (process) for bridging BIOS commands and/or data.

FIG. 3 is a flow chart 300 of a method (process) for bridging BIOS commands and/or data. The method may be performed by a computer system including an embedded-system device (e.g., the BMC 102, the apparatus 102') and a host (e.g., the host computer 190).

At operation 302, the embedded-system device (e.g., via the message handling component 134) receives a first message (e.g., the message 210) including first command or data from a client (e.g., the network device 194). In certain configurations, the embedded-system device, at operation 303, associates the first message with an identifier. At operation 304, the embedded-system device triggers a BIOS (e.g., the BIOS 184) of the host of the embedded-system device to communicate with the embedded-system device. At operation 306, the host receives, at the BIOS, an interrupt (e.g., the interrupt signal 214) triggered by the embedded-system device. At operation 308, the host sends, to the embedded-system device, a request (e.g., the message 216) to retrieve the first command or data.

At operation 310, the embedded-system device receives the request from the BIOS. At operation 312, the embedded-system device sends the first command or data (e.g., via the message 217) to the BIOS in response to the request. At operation 314, the host receives, at the BIOS, the first command or data. At operation 316, the host executes the first command or data. At operation 318, the host generates, at the BIOS, second command or data in response to the execution of the first command or data. At operation 320, the host sends the second command or data (e.g., via the message 220) to the embedded-system device.

At operation 322, the embedded-system device receives second command or data from the BIOS. In certain configurations, at operation 324, the embedded-system device receives, from the client, a third message (e.g., the message 222) including the identifier and requesting a response. At operation 326, the embedded-system device sends, to the client, a second message (e.g., the message 223) including the second command or data. In certain configurations, the second message is sent to the client as the response to the third message. In certain configurations, the first message requests a response, and the second message is sent to the client as the response to the first message.

Figure 4:
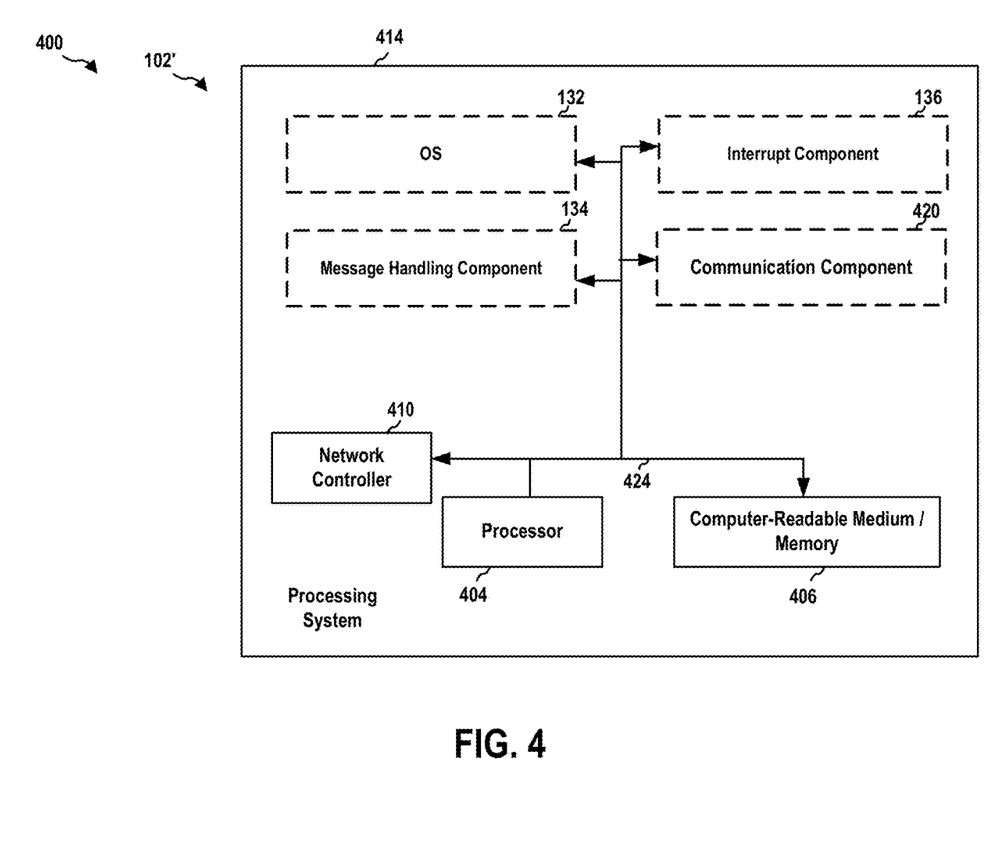
FIG. 4 is a diagram illustrating an example of a hardware implementation for an apparatus employing a processing system.

FIG. 4 is a diagram 400 illustrating an example of a hardware implementation for an apparatus 102' employing a processing system 414. The apparatus 102' may implement the BMC 102. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the OS 132, the message handling component 134, the interrupt component 136, and the computer-readable medium/memory 406. In particular, the computer-readable medium/memory 406 may include the memory 114 and the storage 117. The bus 424 may also link various other circuits such as timing sources, peripherals, voltage regulators, and power management circuits, which are well known in the art, and therefore, will not be described any further.

The processing system 414 may be coupled to a network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 102'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the OS 132, the message handling component 134, the interrupt component 136. The components may be software components running in the processor 404, resident/stored in the computer readable medium/memory 406, one or more hardware components coupled to the processor 404, or some combination thereof.

The apparatus 102' may be configured to include means for performing certain operations described supra referring to FIG. 3. The aforementioned means may be one or more of the aforementioned components of the apparatus 102' and/or the processing system 414 of the apparatus 102' configured to perform the functions recited by the aforementioned means.

Figure 5:
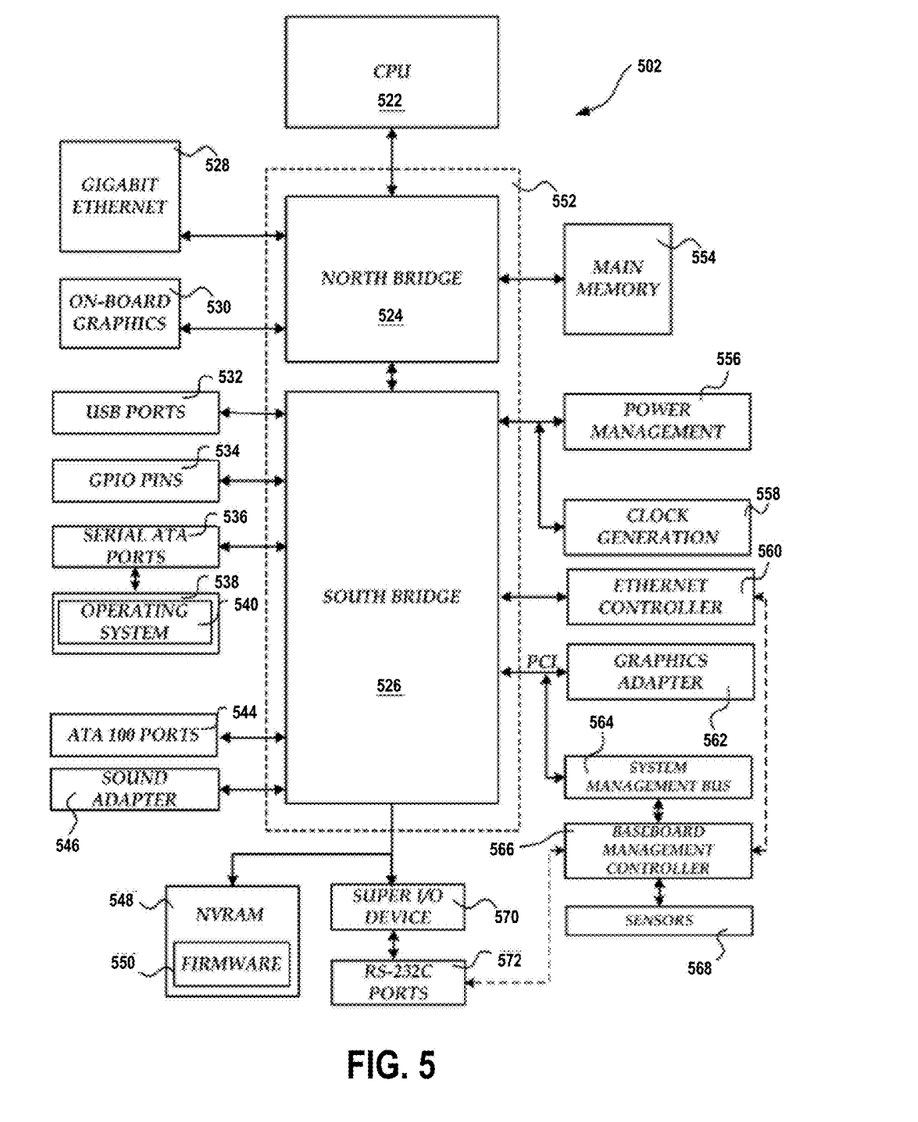
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 190, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, comprising:
receiving, at an embedded-system device in the computer system, a first message including first command or data from a client;
triggering a Basic Input/Output System (BIOS) of a host of the embedded-system device to communicate with the embedded-system device;
receiving, at the embedded-system device, a request from the BIOS;
sending the first command or data to the BIOS in response to the request;
receiving, at the BIOS, the first command or data;
executing the first command or data;
generating, at the BIOS, second command or data in response to the execution of the first command or data; and sending the second command or data to the embedded-system device.

2. The method of claim 1, further comprising:
receiving, at the embedded-system device, second command or data from the BIOS; and
sending, at the embedded-system device and to the client, a second message including the second command or data.

3. The method of claim 2, wherein the first message requests a response, wherein the second message is sent to the client as the response to the first message.

4. The method of claim 1, further comprising:
associating the first message with an identifier; and
receiving, from the client, a third message including the identifier and requesting a response, wherein the second message is sent to the client as the response to the third message.

5. The method of claim 1, further comprising:
receiving, at the BIOS, an interrupt triggered by the embedded-system device; and
sending, to the embedded-system device, a request to retrieve the first command or data.

6. A computer system comprising:
an embedded-system device, including:
   a first memory; and
   first at least one processor coupled to the first memory and configured to:
      receive, at the embedded-system, a first message including first command or data from a client;
      trigger a Basic Input/Output System (BIOS) of a host of the embedded-system device to communicate with the embedded-system device;
      receive, at the embedded-system device, a request from the BIOS; and
      send the first command or data to the BIOS in response to the request; and
the host, wherein the host includes:
   a second memory; and
   second at least one processor coupled to the second memory and configured to:
      receive, at the BIOS, the first command or data;
      execute the first command or data;
      generate, at the BIOS, second command or data in response to the execution of the first command or data; and
      send the second command or data to the embedded-system device.

7. The computer system of claim 6, wherein the first at least one processor is further configured to:
receive, at the embedded-system device, second command or data from the BIOS; and
send, at the embedded-system device and to the client, a second message including the second command or data.

8. The computer system of claim 7, wherein the first message requests a response, wherein the second message is sent to the client as the response to the first message.

9. The computer system of claim 6, wherein the first at least one processor is further configured to:
associate the first message with an identifier; and
receive, from the client, a third message including the identifier and requesting a response, wherein the second message is sent to the client as the response to the third message.

10. The computer system of claim 6, wherein the second at least one processor is further configured to:
receive, at the BIOS, an interrupt triggered by the embedded-system device; and
send, to the embedded-system device, a request to retrieve the first command or data.

11. A non-transitory computer-readable medium storing computer executable code for operating a computer system, comprising code to:
receive, at an embedded-system device in the computer system, a first message including first command or data from a client;
trigger a Basic Input/Output System (BIOS) of a host of the embedded-system device to communicate with the embedded-system device;
receive, at the embedded-system device, a request from the BIOS;
send the first command or data to the BIOS in response to the request;
receive, at the BIOS, the first command or data;
execute the first command or data;
generate, at the BIOS, second command or data in response to the execution of the first command or data; and
send the second command or data to the embedded-system device.

12. The non-transitory computer-readable medium of claim 11, wherein the code is further configured to:
receive, at the embedded-system device, second command or data from the BIOS; and
send, at the embedded-system device and to the client, a second message including the second command or data.

13. The non-transitory computer-readable medium of claim 12, wherein the first message requests a response, wherein the second message is sent to the client as the response to the first message.

14. The non-transitory computer-readable medium of claim 11, wherein the code is further configured to:
associate the first message with an identifier; and
receive, from the client, a third message including the identifier and requesting a response, wherein the second message is sent to the client as the response to the third message.

15. The non-transitory computer-readable medium of claim 11, wherein the code is further configured to:
receive, at the BIOS, an interrupt triggered by the embedded-system device; and
send, to the embedded-system device, a request to retrieve the first command or data.

* * * * *